March 8, 1932. G. V. MABRITO 1,849,041
SHOCK ABSORBER
Filed April 26, 1930
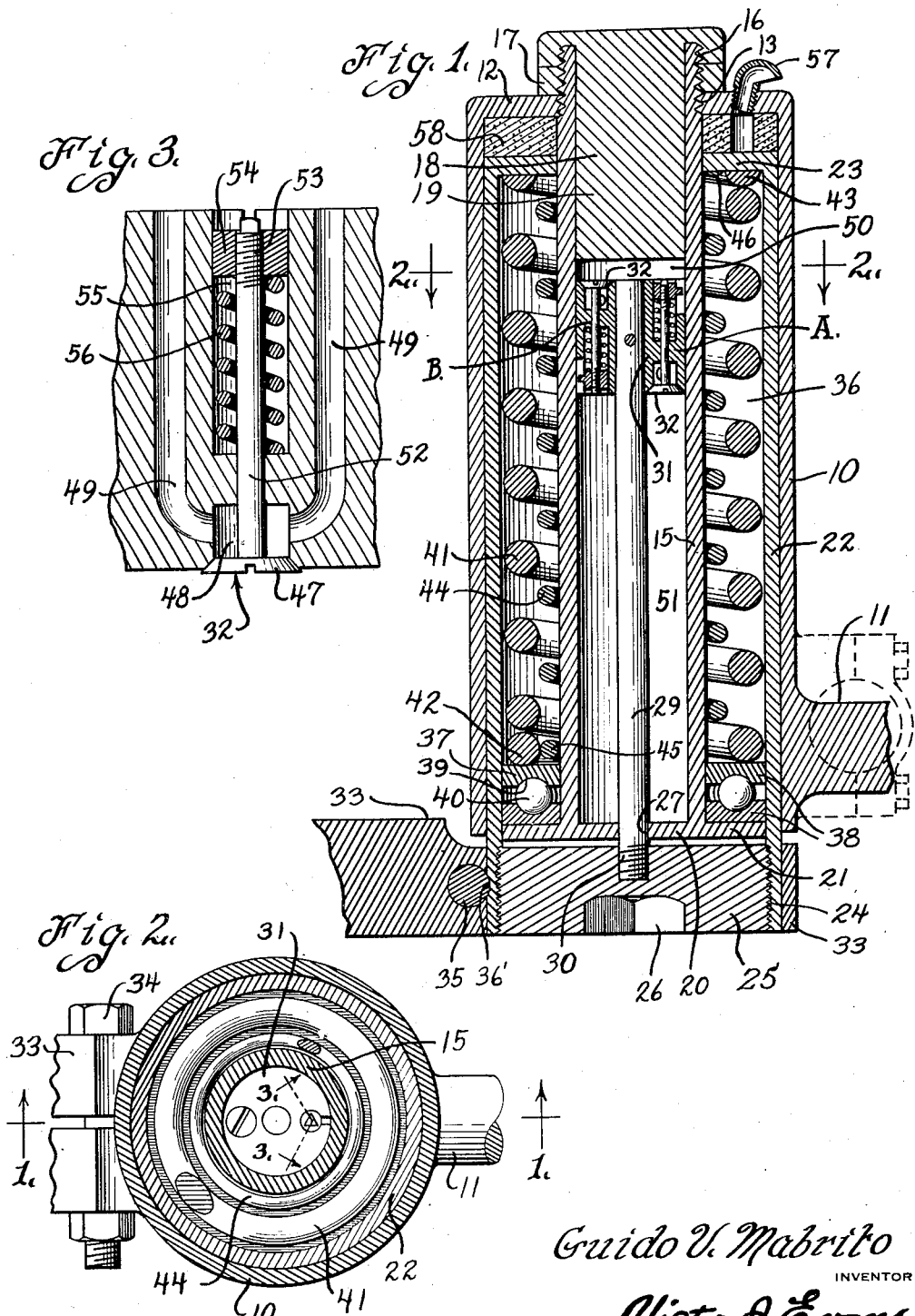
Guido V. Mabrito
INVENTOR
BY Victor J. Evans
HIS ATTORNEY
WITNESS: L. F. Hammand.

Patented Mar. 8, 1932                                              1,849,041

UNITED STATES PATENT OFFICE

GUIDO V. MABRITO, OF CHICAGO, ILLINOIS

SHOCK ABSORBER

Application filed April 26, 1930. Serial No. 447,679.

This invention relates to certain novel improvements in shock absorbers and has for its principal object the provision of an improved construction of this character which will be highly efficient in use and economical in manufacture.

Among the several objects of this invention is to provide a shock absorber wherein spring and liquid means are utilized for absorbing shocks and rebounds brought about by a vehicle traveling over an uneven or rough road.

A still further object of the invention is to provide a shock absorber which is substantially dust proof whereby to assure efficient operation of the several parts comprising the same.

A still further object of the invention is to provide a shock absorber which will assure smooth traveling of a vehicle over a rough or uneven surface and wherein the weaker parts of the vehicle will not be subjected to the usual shock or rebound due to the vehicle traveling over such surfaces.

Other objects will appear hereinafter.

The invention consists in the novel combination and arrangement of parts to be hereinafter described and claimed.

The invention will be best understood by reference to the accompanying drawings, showing the preferred form of construction and in which:

Fig. 1 is a vertical sectional detail view of the invention;

Fig. 2 is a sectional detail view of the same taken substantially on the line 2—2 on Fig. 1; and Fig. 3 is a fragmentary sectional detail view of a certain valve mechanism embodied in the invention.

To accomplish the many objects of this invention it is intended that there be utilized spring and liquid or oil means for absorbing shocks. To accomplish this and the many other objects of the invention I provide a cap 10 which may have formed as an integral part thereof a stud axle 11 to effectuate mounting a vehicle wheel (not shown) thereon. This cap has an open bottom and has formed in its top wall 12 a centrally located opening 13. Threaded into this opening 13 is a tube 15, the outer end of the tube 15 projecting outwardly of the cap with the inner end thereof depending into the cap toward the bottom thereof. Upon the threaded end 16 of the tube is threaded a collar 17 and above this collar 17 there is threaded a plug 18 having a cylindrical portion 19 thereof extending into the tube 15. The opposite or lower end portion of the tube 15 is closed by a plate 20 and this plate 20 provides an annular flange 21 disposed outwardly of the tube 15. It will be thus seen that the tube 15 is connected to the cap 10 by means of the plug 18 and threaded portions of the tube.

Within the cap 10 there is slidably arranged a cylinder 22 closed at its upper end portion as at 23. The cylinder 22 is of such diameter as to snugly fit within the cap 10 whereby to permit smooth sliding engagement between the walls of the cap 10 and adjacent walls of the cylinder 22. The lower end portion 24 of the cylinder is closed by a plug 25 threaded into the cylinder as shown, there being provided a socket 26 in the plug 25 for the insertion of a suitable tool for effectuating threading of the plug 25 into this portion of the cylinder 22.

Formed in the plate 20 is a centrally located opening 27 through which projects a piston rod 29. This piston rod 29 has its lower end portion 30 threaded into the plug 25 as shown. The piston rod extends upwardly and carries at its upper end a piston 31 within which is arranged oppositely related valve structures 32 to be presently described. This piston may be connected to the piston rod 29 in any suitable manner.

The cylinder 22 is connected to the chassis of the vehicle with which the shock absorber is associated in any approved manner and in the present instance this may be accomplished by providing a split collar 33 into which the lower end portion 24 of the cylinder is mounted and this split collar is effectively connected to the cylinder by means of a nut bearing bolt 34 as best shown in Fig. 2, the shank 35 of the bolt being adapted to seat in a suitable groove 36' formed in the lower end portion 24 of the cylinder as shown whereby to prevent turning of the cylinder within the split collar.

As stated, any approved means may be employed to connect the cylinder 22 to the chassis and I do not, therefore, wish to be confined to the specific means illustrated.

As shown, the tube 15 is spaced from the wall of the cylinder 22 to provide a chamber 36. At the lower end portion of this chamber 36 and supported by the flange 21 is a bearing structure 37. This bearing structure 37 includes two spaced race plates 38 between which there is disposed in suitable grooves 39 friction elements 40 such as ball bearings or the like.

Within the chamber 36 there is arranged a coil spring 41, one end 42 of which is seated upon the bearing structure 37 and the opposite end 43 thereof abutting the top 23 of the cylinder 22. Within this coil spring 41 there is arranged an auxiliary or secondary coil spring 44 having one end 45 likewise resting upon the bearing structure 37 and an opposite end 46 thereof abutting the top 23 of the cylinder 22.

The arrangement is such that upon operation of the shock absorber to absorb a shock or break a rebound the spring 41 will first be operative for this purpose assisted by the coil spring 44. Again should either one of the coil springs be ruptured the other or remaining coil spring will render the device effective.

Referring again to the valve structures 32, each of these valve structures include a valve head 47 normally adapted to close a valve chamber 48 which communicates with oppositely disposed passages 49. The ends of these passages 49 which are opposite the valve chamber 48 in that one of the valve structures indicated at A, communicate with the portion 50 of the chamber 51 provided by the tube 15 above the valve structures 32. The ends of the passages opposite the valve chamber 48 of the valve structure B communicate with the chamber 51 below the valve structures 38.

The valve head 47 is carried by a valve stem 52 and at the end 53 of this valve stem there is provided a nut structure 54 which operates in a chamber 55. Arranged in this chamber 55 and surrounding the valve stem 52 is a spring 56, the purpose of which is to bear against the nut structure 54 to retain the valve head 47 in a closed position.

Referring to Fig. 1 of the drawings, it will be seen that means is provided to permit the escape of air from within the cap 10 and in the present instance this means includes an outlet conduit 57 which communicates, as shown, with the upper end portion of the cap. Arranged within the cap 10 above the cylinder 22 is a cushion member 58, the purpose of which is to absorb and lessen the shock as the cylinder and cap move together to their extreme positions.

From the description herein taken in connection with the accompanying drawings, it will be manifest that movement between the cap and the cylinder is resisted by means of the coil springs 41 and 42. Also that this movement is resisted by means of liquid adapted to be confined in the chamber 51 is manifest. Upon downward movement of the valve structure 32 the pressure of the liquid in the chamber 51 will be exerted against the valve head 47 of the valve structure B. This will open the valve head and permit the liquid to pass into the chamber portion 50. Upon retroactive movement of the valve structure 32 the liquid pressure in the chamber portion 51 will be exerted upon the valve head 47 of the valve structure A thereby unseating this valve head to permit repassage of the liquid into the chamber 51.

It is apparent that the structure of the device is such that the several operative parts thereof is protected from collection of dust and other foreign ingredients. It is also apparent that the arrangement of the parts, being of a simple nature, will effectively serve as a shock absorber, to be applied to a vehicle of any character, to absorb the shock and lessen the rebound of the vehicle when traveling over rough or uneven surfaces.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claims.

Having thus described my invention what I claim as new and desire to protect by Letters Patent is:

1. A shock absorber comprising a cap and a cylinder movable rotatively and circumferentially therein, a tubular member carried by said cap, extending into said cylinder and having a flange at one end, spring cushioning means in said cylinder and disposed upon said flange, and liquid cushioning means operable in said tubular member including a piston movable with said cylinder.

2. A shock absorber including a cap, means for connecting the cap to a wheel structure, a cylinder operable in the cap, means for connecting the cylinder to the chassis portion of a vehicle, a tubular member carried by said cap and extending into said cylinder and provided at one end portion with an annular flange, spring means arranged in said cylinder and seated upon said flange, a piston operated in said tube, means connecting said piston to said cylinder, and valve structures associated with said piston and arranged in opposed relation with respect to each other for alternate operation.

3. A shock absorber including two telescopically arranged longitudinally and circumferentially movable members, spring means arranged within one of said members, a member carried by the other of the tubular members and extending into said one tubular member and having portions thereof providing a seat, and a bearing structure mounted upon said seat and disposed between said seat and said spring means, a piston arranged in said member, means connecting said piston to said one of said two members, valve structures associated with said piston and arranged in opposed relation with respect to each other for alternate operation.

In testimony whereof I affix my signature.

GUIDO V. MABRITO.